US009901134B2

(12) United States Patent
Bryne

(10) Patent No.: US 9,901,134 B2
(45) Date of Patent: Feb. 27, 2018

(54) AERODYNAMIC BICYCLE SHOE COVER AND PEDAL COVER

(71) Applicant: Speedplay, Inc., San Diego, CA (US)

(72) Inventor: Richard M. Bryne, San Diego, CA (US)

(73) Assignee: Speedplay, Inc., San Diego, CA (US)

( * ) Notice: Subject to any disclaimer, the term of this patent is extended or adjusted under 35 U.S.C. 154(b) by 273 days.

(21) Appl. No.: 14/286,915

(22) Filed: May 23, 2014

(65) Prior Publication Data

US 2014/0250737 A1   Sep. 11, 2014

Related U.S. Application Data

(62) Division of application No. 12/472,255, filed on May 26, 2009, now Pat. No. 8,745,900.

(51) Int. Cl.
*A43B 5/14* (2006.01)
*A43B 5/18* (2006.01)
*B62M 3/08* (2006.01)

(52) U.S. Cl.
CPC .............. *A43B 5/185* (2013.01); *A43B 5/14* (2013.01); *A43B 5/18* (2013.01); *B62M 3/086* (2013.01);
(Continued)

(58) Field of Classification Search
CPC .. A43B 5/18; A43B 5/185; A43B 5/14; A41D 13/00; A41D 13/0015; A41D 2400/24; A41D 2400/38; B62M 3/086
(Continued)

(56) References Cited

U.S. PATENT DOCUMENTS 33,447 A  * 10/1861  Sadler ................... F21V 7/09
                                                    362/346
D33,447 S * 10/1900  Sadler ........................ D2/980
(Continued)

FOREIGN PATENT DOCUMENTS

DE    2816189 A1    8/1979
DE    3315282 A1   10/1984
(Continued)

OTHER PUBLICATIONS

Frog Pedal Specifications, www.speedplay.com.
(Continued)

*Primary Examiner* — Jila M Mohandesi
(74) *Attorney, Agent, or Firm* — Sheppard, Mullin, Richter & Hampton LLP

(57) ABSTRACT

The present invention is embodied in a new aerodynamic cover for a bicycle shoe and clipless bicycle pedal for improving speed when cycling. The aerodynamic cover comprises a main body including an ankle portion having a rear side, a heel portion connected to the ankle portion, and a sole portion connected to the heel portion and having an underside. An opening is formed in the sole portion for allowing a bicycle pedal to be engaged to the bicycle cleat. An outwardly extending fin stretches from the rear side of the ankle portion, around the heel portion, to the underside of the sole portion. In one embodiment, the aerodynamic cover further comprises a pedal layer, a cleat layer, and a base plate layer. A gap is defined between the pedal layer and the cleat layer. The gap inhibits excessive friction between the pedal layer and the cleat layer as the cleat is pivoted with respect to the pedal.

10 Claims, 16 Drawing Sheets

(52) U.S. Cl.
CPC ....... *A41D 2400/24* (2013.01); *Y10T 74/2168* (2015.01)

(58) Field of Classification Search
USPC .............................. 36/131; 2/16, 22, 24, 911
See application file for complete search history.

(56) References Cited

U.S. PATENT DOCUMENTS

| | | | |
|---|---|---|---|
| 1,370,730 A | | 3/1921 | Carver |
| 2,776,582 A | * | 1/1957 | Blades .................. G05G 1/483 292/DIG. 2 |
| 3,808,910 A | | 5/1974 | Desbois |
| 3,859,867 A | | 1/1975 | Haines et al. |
| 4,055,005 A | | 10/1977 | Meinhart |
| 4,298,210 A | | 11/1981 | Lotteau |
| 4,461,098 A | * | 7/1984 | Diegelman ............ A41D 17/00 2/61 |
| 4,488,453 A | | 12/1984 | Drugeon et al. |
| 4,599,914 A | | 7/1986 | Dunn et al. |
| 4,599,915 A | | 7/1986 | Hlavac et al. |
| 4,735,107 A | | 4/1988 | Winkle |
| 4,739,564 A | | 4/1988 | Eser |
| 4,803,894 A | | 2/1989 | Howell |
| 4,815,333 A | | 3/1989 | Sampson |
| 4,819,504 A | | 4/1989 | Sampson |
| 4,827,633 A | | 5/1989 | Feldstein |
| 4,827,797 A | | 5/1989 | Le Faou et al. |
| 4,840,086 A | | 6/1989 | Bidal |
| 4,898,063 A | | 2/1990 | Sampson |
| 4,899,618 A | | 2/1990 | Christol |
| 4,936,164 A | | 6/1990 | Forke |
| 4,942,778 A | | 7/1990 | Bryne |
| 5,007,185 A | | 4/1991 | Lazarski |
| 5,031,342 A | | 7/1991 | Crook |
| 5,079,968 A | | 1/1992 | Starner |
| 5,199,324 A | | 4/1993 | Sain |
| 5,213,009 A | | 5/1993 | Bryne |
| 5,284,066 A | | 2/1994 | Weiss |
| 5,311,676 A | * | 5/1994 | Hughes .................. A43B 3/24 36/100 |
| 5,321,995 A | | 6/1994 | Zedan |
| 5,325,738 A | | 7/1994 | Bryne |
| 5,363,573 A | | 11/1994 | Kilgore et al. |
| 5,371,903 A | * | 12/1994 | Lew ........................ A41D 13/00 2/1 |
| 5,406,647 A | | 4/1995 | Lew |
| 5,546,829 A | | 8/1996 | Bryne |
| 5,553,516 A | | 9/1996 | Weiss |
| 5,557,985 A | | 9/1996 | Nagano |
| 5,575,184 A | | 11/1996 | De Schrijver |
| 5,606,894 A | | 3/1997 | Bryne |
| 5,657,558 A | | 8/1997 | Pohu |
| 5,687,619 A | | 11/1997 | Bryne |
| 5,697,262 A | | 12/1997 | Chen |
| 5,727,429 A | | 3/1998 | Ueda |
| 5,765,450 A | | 6/1998 | Kruger et al. |
| 5,778,739 A | | 7/1998 | Takahama |
| 5,784,931 A | | 7/1998 | Ueda |
| 5,806,379 A | | 9/1998 | Nagano |
| 5,845,416 A | * | 12/1998 | Hands .................... A43B 3/18 36/105 |
| 5,852,955 A | | 12/1998 | Crisick et al. |
| 5,860,330 A | | 1/1999 | Code et al. |
| 5,862,716 A | | 1/1999 | Bryne |
| 5,887,280 A | * | 3/1999 | Waring .................... A41D 7/00 2/10 |
| 5,916,332 A | | 6/1999 | Chen |
| D413,711 S | | 9/1999 | Hicks, Jr. |
| 5,950,333 A | * | 9/1999 | Tsen ...................... A43B 5/001 36/127 |
| 5,987,778 A | * | 11/1999 | Stoner .................. A41D 17/00 36/1.5 |
| 6,003,408 A | | 12/1999 | Hervig |
| 6,014,914 A | | 1/2000 | Ueda |
| 6,070,493 A | | 6/2000 | Chen |
| 6,128,973 A | | 10/2000 | Nagano |
| 6,151,989 A | | 11/2000 | Ueda |
| 6,205,885 B1 | | 3/2001 | Hermansen et al. |
| 6,244,136 B1 | | 6/2001 | Chen |
| 6,309,010 B1 | | 10/2001 | Whitten |
| 6,425,304 B1 | | 7/2002 | Bryne |
| 6,446,529 B1 | | 9/2002 | Tanaka |
| 6,453,771 B1 | | 9/2002 | Takahama et al. |
| 6,490,948 B2 | | 12/2002 | Tanaka |
| 6,494,117 B1 | | 12/2002 | Bryne |
| 6,581,493 B1 | | 6/2003 | Gillane |
| D481,974 S | | 11/2003 | Evans |
| 7,013,754 B2 | | 3/2006 | Milanowski |
| 7,017,445 B2 | | 3/2006 | Bryne |
| 7,174,807 B2 | | 2/2007 | Bryne |
| 7,322,259 B2 | | 1/2008 | De Bast et al. |
| 7,383,646 B2 | * | 6/2008 | Hall ...................... A43B 3/0078 36/7.1 R |
| 7,464,487 B2 | * | 12/2008 | Boyd .................... A43B 3/0078 36/136 |
| 7,472,498 B2 | | 1/2009 | Bryne |
| D595,620 S | | 7/2009 | Kingsbury |
| 7,779,560 B2 | | 8/2010 | Kay |
| 7,856,905 B2 | | 12/2010 | Hsieh |
| 7,877,904 B2 | | 2/2011 | Bryne |
| 7,908,771 B2 | * | 3/2011 | Foxen ...................... A43B 7/20 36/100 |
| 8,272,150 B2 | | 9/2012 | Bryne |
| 8,387,287 B2 | | 3/2013 | Kay et al. |
| D683,665 S | | 6/2013 | Smith |
| 8,984,694 B2 | * | 3/2015 | Teichert .................. A43B 3/16 12/142 R |
| 2001/0008093 A1 | | 7/2001 | Heim |
| 2002/0144569 A1 | | 10/2002 | Tanaka |
| 2003/0051576 A1 | | 3/2003 | Muraoka |
| 2003/0192399 A1 | | 10/2003 | Milanowski |
| 2004/0187635 A1 | | 9/2004 | Bryne |
| 2004/0237705 A1 | | 12/2004 | Conarro et al. |
| 2005/0155452 A1 | | 7/2005 | Frey |
| 2005/0252337 A1 | | 11/2005 | Chen |
| 2005/0284253 A1 | | 12/2005 | Hervig |
| 2006/0070489 A1 | | 4/2006 | Chen |
| 2006/0134379 A1 | | 6/2006 | Pulkka |
| 2006/0236809 A1 | | 10/2006 | Bryne |
| 2007/0084086 A1 | | 4/2007 | Bryne |
| 2007/0193402 A1 | | 8/2007 | Hsieh |
| 2010/0107451 A1 | | 5/2010 | Kay et al. |
| 2011/0283568 A1 | | 11/2011 | Woodford |
| 2012/0103131 A1 | | 5/2012 | Bryne |
| 2012/0233891 A1 | | 9/2012 | Woodford |

FOREIGN PATENT DOCUMENTS

| | | |
|---|---|---|
| DE | 3426103 A1 | 1/1986 |
| DE | 3149345 C2 | 1/1989 |
| DE | 202005019542 U1 | 2/2006 |
| EP | 0012097 A2 | 6/1980 |
| EP | 0015803 A2 | 9/1980 |
| EP | 0106162 A1 | 4/1984 |
| EP | 0153210 A1 | 8/1985 |
| EP | 0155114 A2 | 9/1985 |
| EP | 0293340 A2 | 11/1988 |
| EP | 0359134 A2 | 3/1990 |
| EP | 0485956 A1 | 5/1992 |
| EP | 0516013 A2 | 12/1992 |
| EP | 0619219 A1 | 10/1994 |
| EP | 0826587 A1 | 3/1998 |
| EP | 0894446 A1 | 2/1999 |
| FR | 2279607 A1 | 2/1976 |
| FR | 2518041 A1 | 6/1983 |
| FR | 2609270 A1 | 7/1988 |
| FR | 2711963 A1 | 5/1995 |
| FR | 2775424 A1 | 9/1999 |
| FR | 2932450 A1 | 12/2009 |
| JP | 64-23202 | 7/1989 |
| JP | 05111402 | 5/1993 |
| JP | H11-103902 | 4/1999 |

(56) References Cited

FOREIGN PATENT DOCUMENTS

| | | |
|---|---|---|
| JP | 2005-46629 | 2/2005 |
| TW | 232294 | 10/1994 |
| TW | 368973 | 9/1999 |
| TW | 392662 | 6/2000 |
| TW | 200303278 | 9/2003 |
| TW | M293881 | 7/2006 |
| TW | I308543 | 4/2009 |
| WO | WO2004089741 | 10/2004 |

OTHER PUBLICATIONS

Speedplay brochure.
International Search Report for International Application No. PCT/US2010/056057.
International Preliminary Report on Patentability for International Application No. PCT/US2010/056057.
European Search Report for Application No. 13190753.7-1753.
Office Action for Japanese Patent Application No. 2011-540875.
bont.com, Bont Crono, www.bont.com/cycling/pages/bontcrono.html.
pearlizumi.com, PI Aero Lycra Shoe Cover, www.pearlizumi.com/product.pjp?mode=view&pc_id=50&product_id=193110.

\* cited by examiner

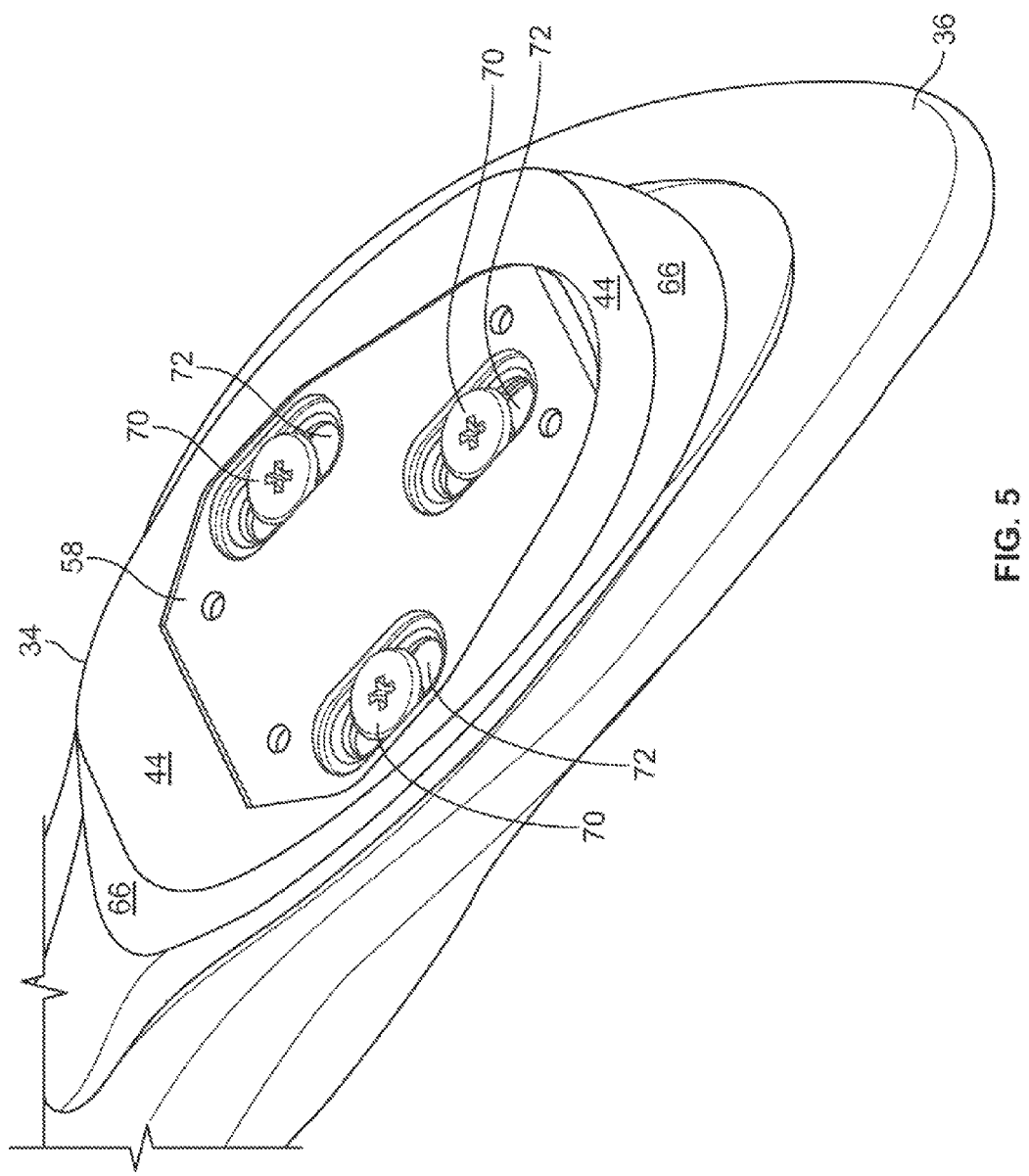

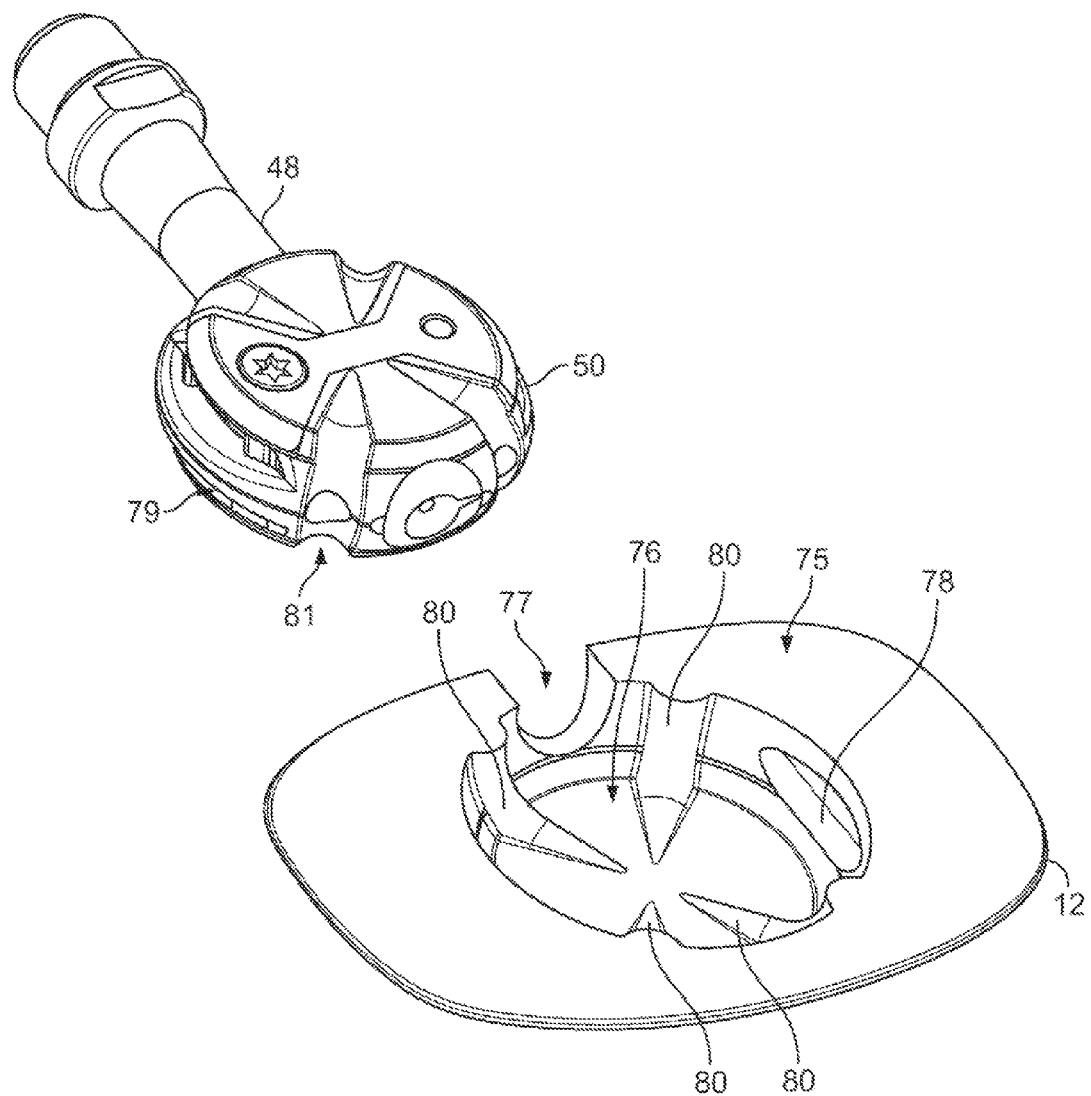

AERODYNAMIC BICYCLE SHOE COVER AND PEDAL COVER

CROSS-REFERENCE TO RELATED APPLICATION

This is a divisional of prior application Ser. No. 12/472,255, filed May 26, 2009, which is herein incorporated by reference.

BACKGROUND OF THE INVENTION

This invention relates generally to bicycle shoe covers and pedal covers and, more particularly, to a bicycle shoe cover and pedal cover that are aerodynamically optimized for bicycle racing.

Shoes and pedals play an important role in the aerodynamics of bicycle racing. During the top half of a pedal stroke, both the shoe and pedal travel into the wind faster than the rest of the bicycle frame and rider. Thus, improving the aerodynamics of shoes and pedals is particularly valuable in terms of reducing wind drag and optimizing speed.

In the past, lycra shoe covers have been designed to improve the aerodynamics of bicycle shoes. An example is the Pearl Izumi Aero Lycra Shoe Cover, sold by Pearl Izumi USA, Inc. of Louisville, Colo. The lycra material is lightweight and breathable, and can be stretched to fit snugly over a bicycle shoe. A zipper closure secures the shoe cover in place. Although such shoe covers improve the aerodynamics of bicycle shoes, the aerodynamics are still less than optimal.

In the past, clipless pedal/cleat assemblies have been designed that allow the bicyclist to pivot a shoe cleat with respect to a bicycle pedal so that the cleat can be easily engaged to and disengaged from the pedal. These pedal/cleat assemblies have lacked an aerodynamic cover optimized for bicycle racing. For example, U.S. Pat. No. 6,494,117 to Bryne discloses a clipless pedal/cleat assembly having a float range that is easily and precisely adjusted. Although the pedal/cleat assembly disclosed in this patent is lightweight and presents only a small forward profile, the aerodynamics of this pedal/cleat assembly could be improved with an appropriate cover.

It should be appreciated from the foregoing description that there is a need for an aerodynamic cover for a bicycle shoe and clipless pedal/cleat assembly that is optimized for bicycle racing. Specifically, there is a need for an aerodynamic cover that minimizes wind drag while not interfering with the ease with the cleat assembly can be engaged to and disengaged from the bicycle pedal. The present invention satisfies these needs and provides further related advantages.

SUMMARY OF THE INVENTION

The present invention is embodied in a new aerodynamic cover for a bicycle shoe and clipless bicycle pedal for improving speed when cycling. The aerodynamic cover comprises a main body including an ankle portion having a rear side, a heel portion connected to the ankle portion, and a sole portion connected to the heel portion and having an underside. An opening is formed in the sole portion for allowing a bicycle pedal to be engaged to the bicycle cleat. An outwardly extending fin stretches from the rear side of the ankle portion, around the heel portion, to the underside of the sole portion.

More particularly, the sole portion generally defines a plane. The fin is generally symmetrical about an axis that extends through the heel portion at an angle of approximately 30 degrees to approximately 40 degrees, are preferably at an angle of approximately 35 degrees, with respect to the plane of the sole portion. Dimples are formed on an outside surface of the main body for reducing drag.

In other, more detailed features of the invention, the main body further includes a cleat cover portion aligned with the opening formed in the sole portion and configured to receive a bicycle cleat. The rear portion of the cleat cover portion can be connected to a front portion of the fin or be spaced from the fin.

More particularly, the cleat cover portion has a substantially planar bottom surface, a substantially planar top surface spaced in a substantially parallel relationship with the bottom surface of the cleat cover portion, and an opening extending from the bottom surface of the cleat cover portion to the top surface of the cleat cover portion and configured to receive the cleat. The cleat cover portion can be attached to the sole portion or can be a separate piece from the remainder of the aerodynamic cover. The bottom surface of the cleat cover portion covers a smaller area than the top surface of the cleat cover portion.

In one embodiment, the bicycle cleat is configured to releasably engage a clipless bicycle pedal. The cleat comprises a spring housing, a bottom plate configured to be secured to the spring housing, and a spring clip mounted between the spring housing and the bottom plate. The spring housing and bottom plate define an opening sized and shaped to receive a top portion of the clipless bicycle pedal.

In other, more detailed features of the invention, the aerodynamic cover further comprises a pedal cover having a rounded bottom surface, a substantially planar top surface, and a recess defined in the top surface of the pedal cover and configured to receive a bottom portion of a bicycle pedal. A gap is defined between the pedal cover and the cleat cover portion when the bottom portion of the bicycle pedal has been received in the recess defined in the top surface of the pedal cover, a cleat has been received in the opening extending from the bottom surface of the cleat cover portion to the top surface of the cleat cover portion, and the cleat has engaged the bicycle pedal. The gap inhibits excessive friction between the pedal cover and the cleat cover portion as the cleat is pivoted with respect to the pedal. In one embodiment there is less than or equal to approximately 2 Newton meters of rotational torque resistance between the pedal cover and the cleat cover portion as the cleat is pivoted with respect to the pedal.

In one embodiments the recess defined in the top surface of the pedal cover extends to a side of the pedal cover, creating an indentation configured to receive a bottom portion of a bicycle pedal spindle. A plurality of tabs extend into the recess and are configured to engage the clipless bicycle pedal. A plurality of projections extend longitudinally in the recess for assisting in properly aligning the pedal cover with the clipless bicycle pedal. Dimples are formed on an outside surface of the pedal cover for reducing drag.

In one embodiment the aerodynamic cover further comprises a base plate cover. The base plate cover has a substantially planar bottom surface, a top surface that substantially conforms to the bottom surface of the shoe, and an opening extending from the bottom surface of the base plate covey to the top surface of the base plate cover and configured to receive a base plate. The bottom surface of the base plate cover covers a smaller area than the top surface of the base plate cover. The base plate is configured to be attached to a cleat and follow the contour of a bottom surface of a shoe sole.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 5 is a perspective view of the base plate cover of FIG. 3 and a base plate positioned on the underside of a shoe sole.

FIG. 6A is a perspective view of the pedal cover of FIG. 1 and a bicycle pedal with the pedal cover detached from the pedal.

DETAILED DESCRIPTION OF THE PREFERRED EMBODIMENTS

Figure 1:
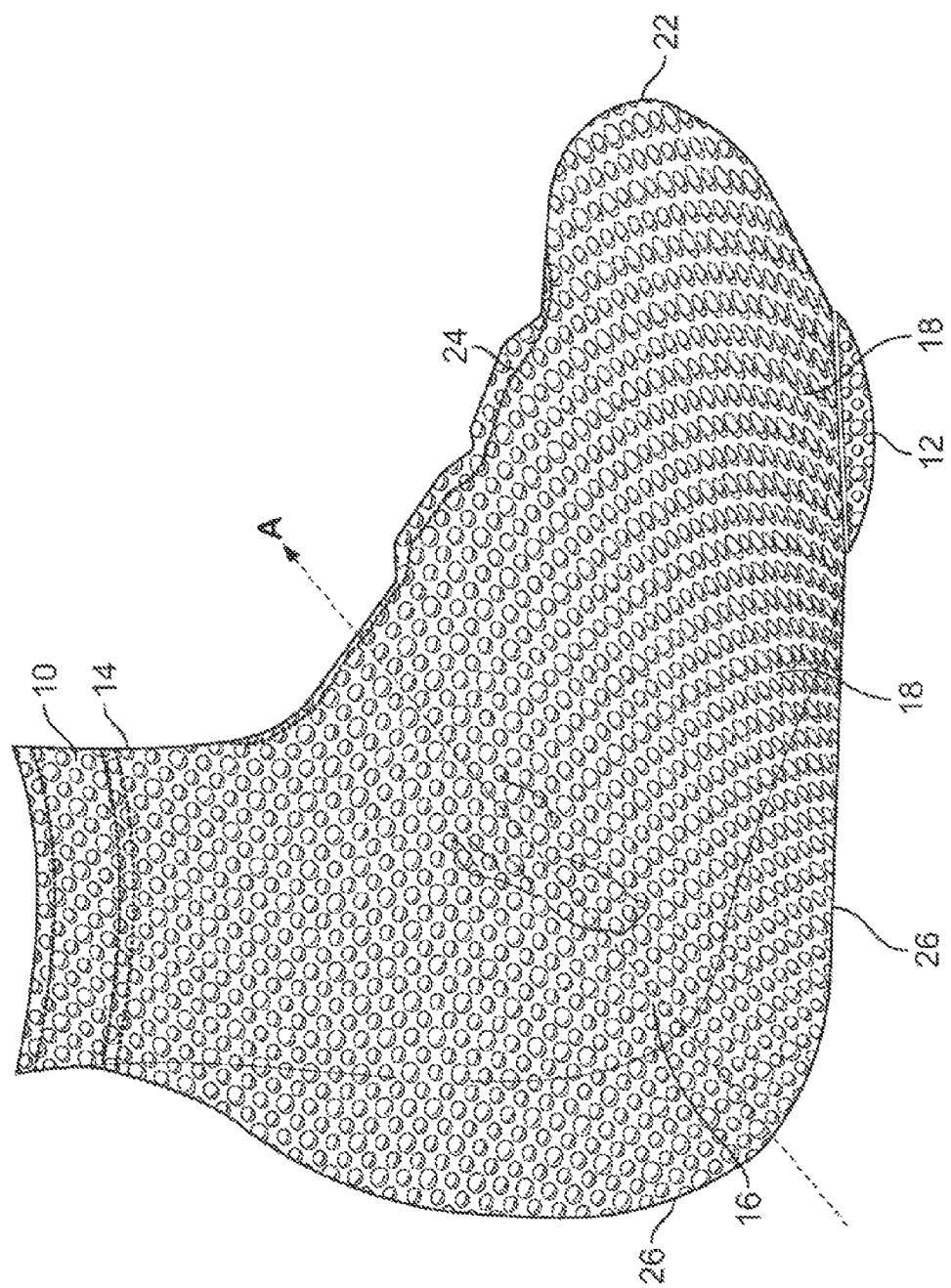
FIG. 1 is a right-side elevation view of a right-foot aerodynamic bicycle shoe cover and pedal cover in accordance with an embodiment of the present invention.
Figure 2:
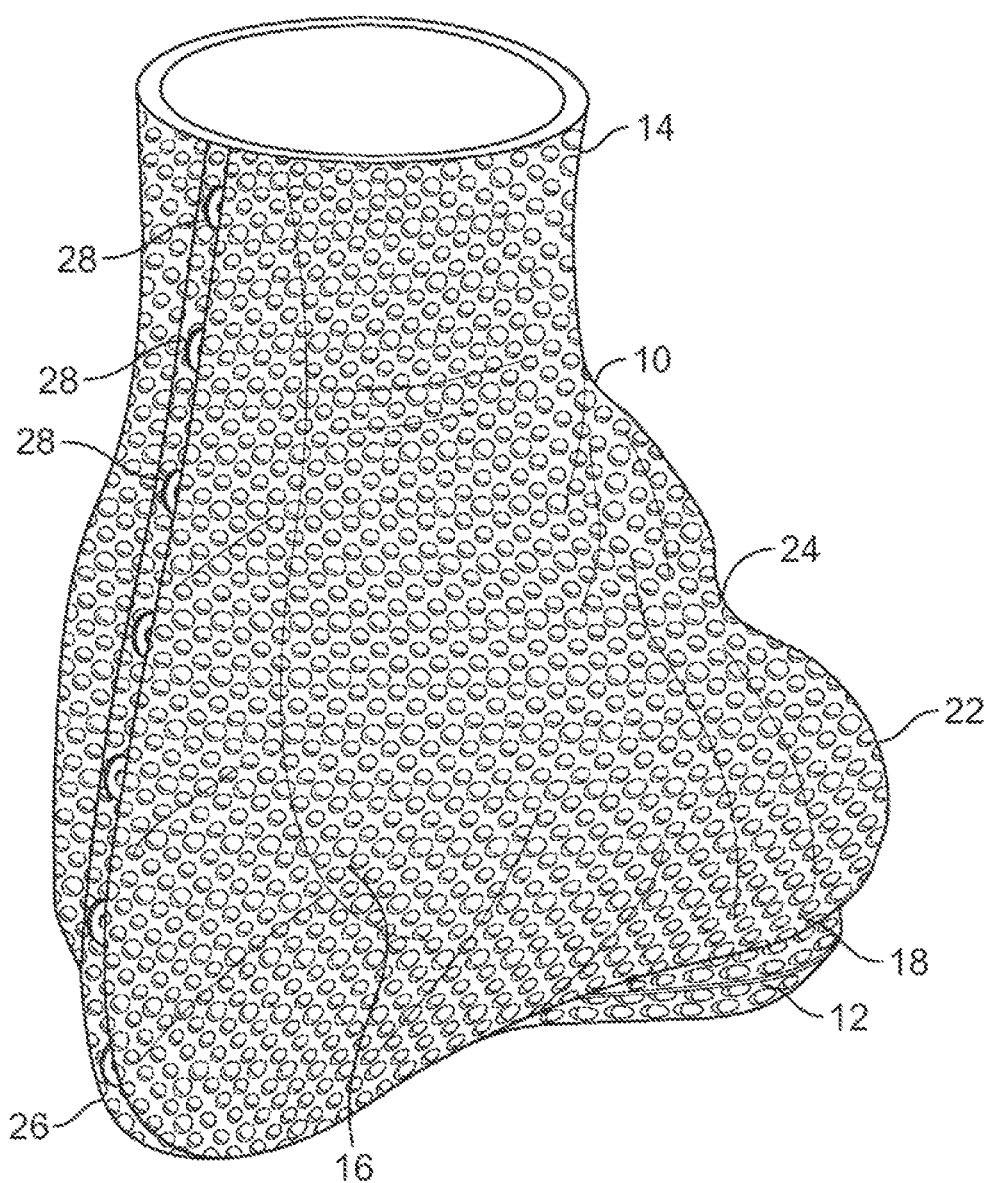
FIG. 2 is a perspective view of the shoe cover and pedal cover of FIG. 1.

With reference to FIGS. 1 and 2, there is shown a right-foot aerodynamic bicycle shoe cover 10 and pedal cover 12 in accordance with an embodiment of the present invention. The particular covers shown are configured for a right bicycle shoe and pedal, but it will be appreciated that similar covers could be oppositely configured for a left bicycle shoe and pedal.

The shoe cover 10 comprises an ankle portion 14, a heel portion 16, a sole portion 18, a cleat cover portion 20 (see FIGS. 3 and 4), a toe portion 22, a top portion 24, a fin 26, and a mechanical closure 28. The fin extends down from the rear side of the ankle portion, around the heel portion, to the underside of the sole portion. The fin is thickest at its innermost portions, where it connects with the ankle portion, heel portion, and sole portion, and thinnest at its outermost portions. In one embodiment, the fin is generally symmetrical about an axis A that extends through the heel portion at an angle of approximately 30 degrees to approximately 40 degrees, and preferably at an angle of approximately 35 degrees, with respect to the general plane of the sole portion. The fin can be formed of a lightweight material, such as closed-cell foam, covered by an aerodynamic material, such as plasticized or rubberized lycra. The fin improves the aerodynamics of the shoe cover, lessening air turbulence behind the shoe cover at it moves through the air. By giving the shoe cover a more streamlined shape, the fin reduces drag caused by a low pressure region created at the rear of the shoe cover.

The mechanical closure 28 secures the shoe cover 10 in place over the shoe. The mechanical closure may comprise a zipper, hook-and-loop fastener, snaps, or other closure device. In one embodiment, the mechanical closure is part of the fin 26. In this embodiment, the fin is divided into a left part and a right part that can be snapped, zipped, or otherwise fastened together.

Figure 3:
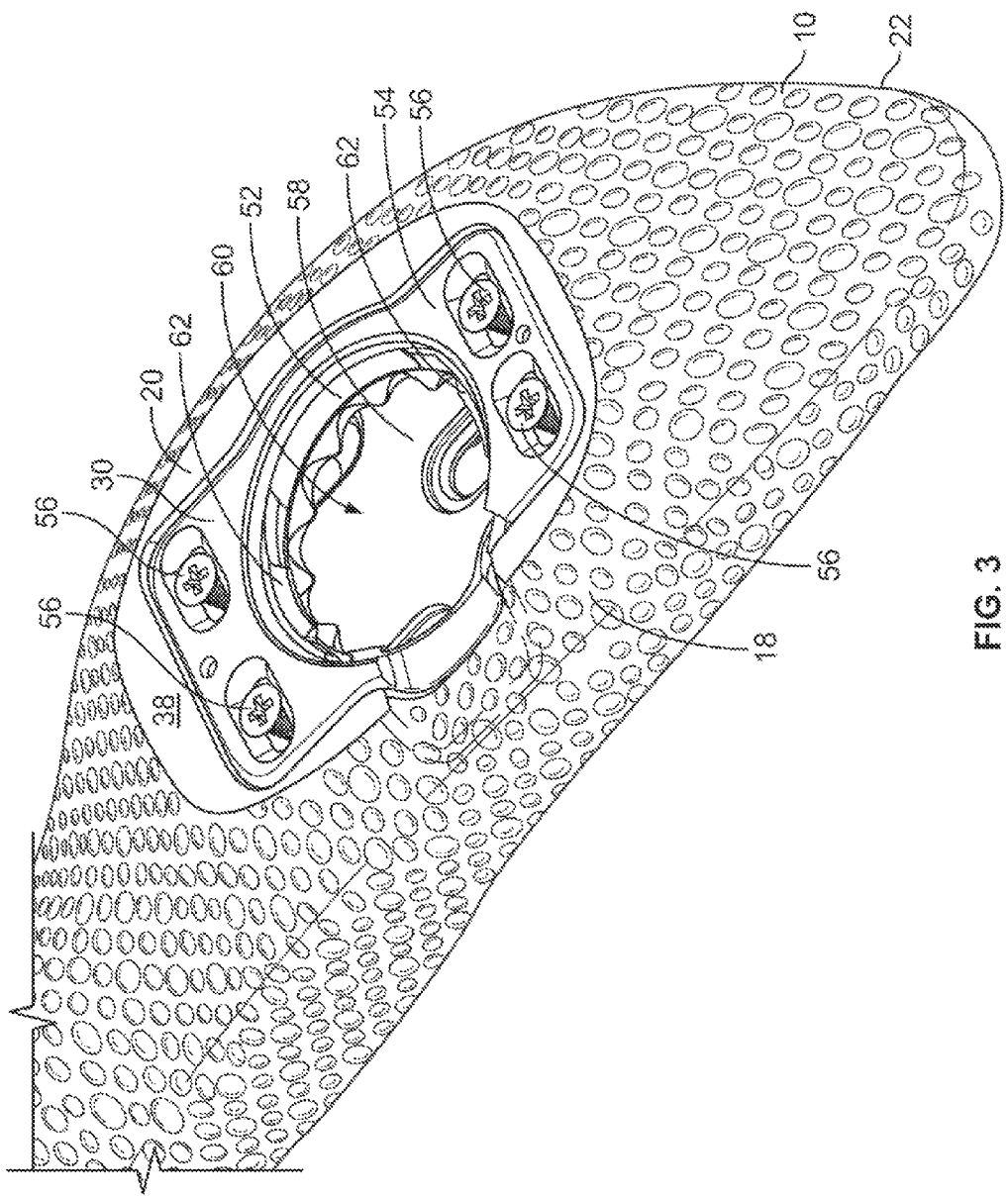
FIG. 3 is a perspective view of a bicycle cleat and the sole portion, cleat cover portion, and toe portion of the shoe cover of FIG. 1, with the cleat detached from a bicycle pedal.

With reference now to FIG. 3, there is shown a bicycle cleat 30 and the sole portion 18, cleat cover portion 20, and toe portion 22 of the shoe cover 10 in accordance with an embodiment of the present invention, with the cleat detached from a bicycle pedal. As shown in FIG. 3, an opening is formed in the cleat cover portion to accommodate the cleat and allow the cleat to be engaged to a bicycle pedal.

In one embodiment, the cleat cover portion 20 is integral to the remainder of the shoe cover 10. The cleat cover portion can be formed of a lightweight material such as closed-cell foam, and bonded to the aerodynamic material that comprises the sole portion 18. The rear end of the cleat cover portion can be connected to or spaced from the fin 26 (shown in FIGS. 1 and 2). In another embodiment, the cleat cover portion is a separate piece from the remainder of the shoe cover, in which case the sole portion can be configured to fit snugly over the rounded edge of the cleat cover.

Figure 4:
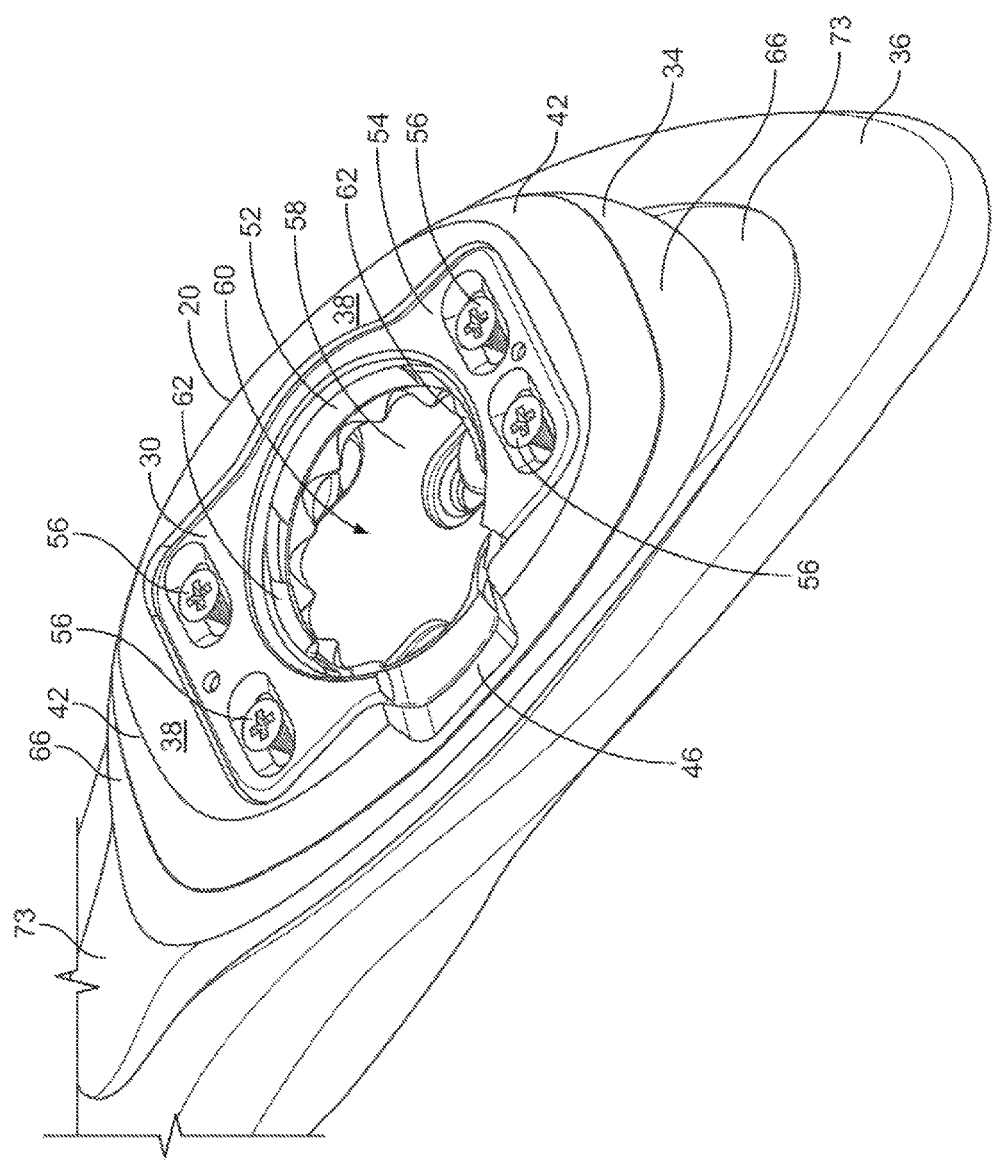
FIG. 4 is a perspective view of the cleat of FIG. 3, the cleat cover portion of the shoe cover of FIG. 1, and a base plate cover positioned on the underside of a shoe sole, with the remaining portions of the shoe cover removed to show the shoe sole and the details of the cleat, cleat cover portion, and base plate cover.
Figure 8:
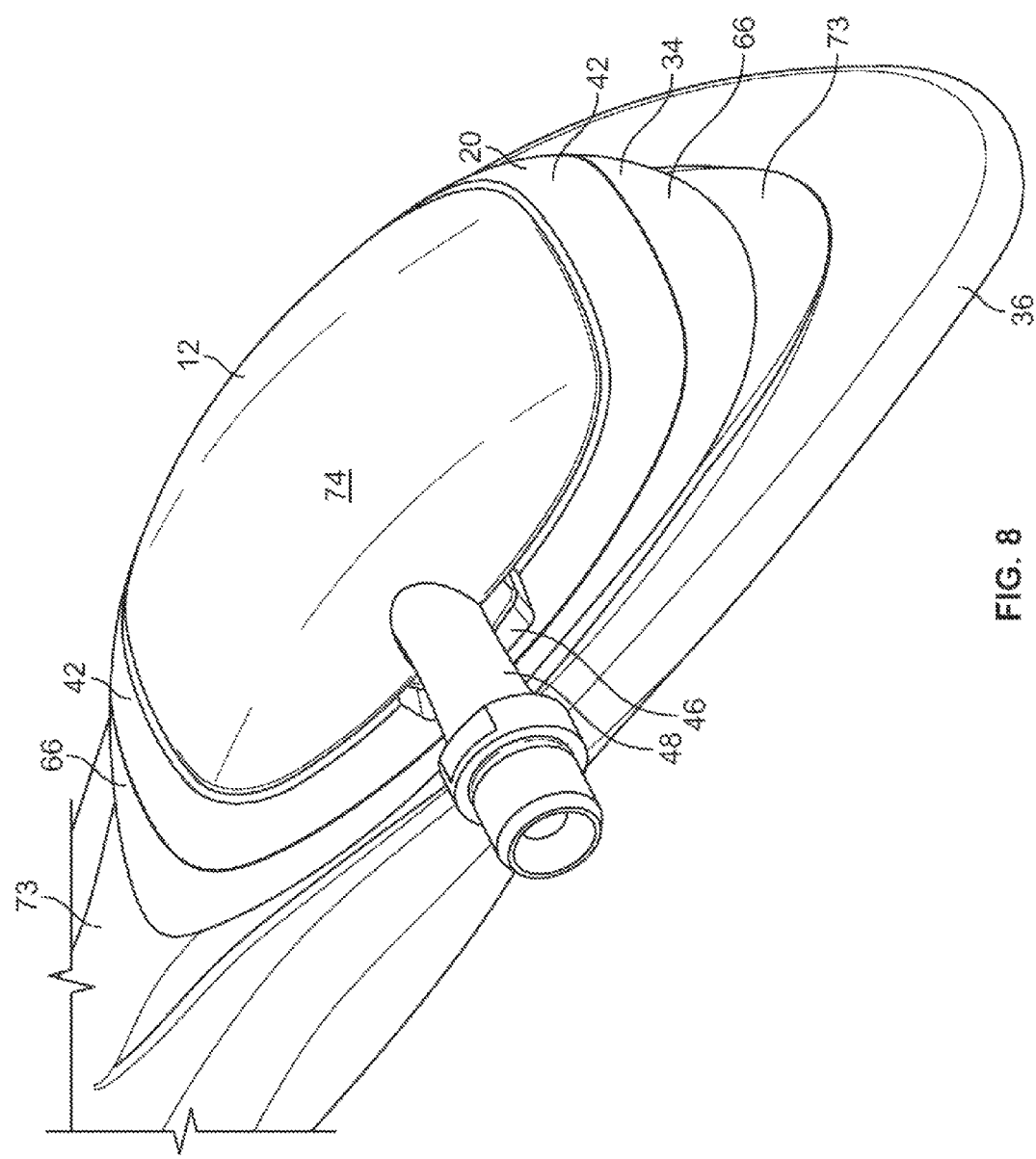
FIG. 8 is a perspective view of the pedal cover of FIG. 1, the cleat cover portion of the shoe cover of FIG. 1, and the base plate cover of FIG. 5 positioned on the underside of a shoe sole, with the remaining portions of the shoe cover removed to show the shoe sole and the details of the cleat cover portion and base plate cover.
Figure 9:
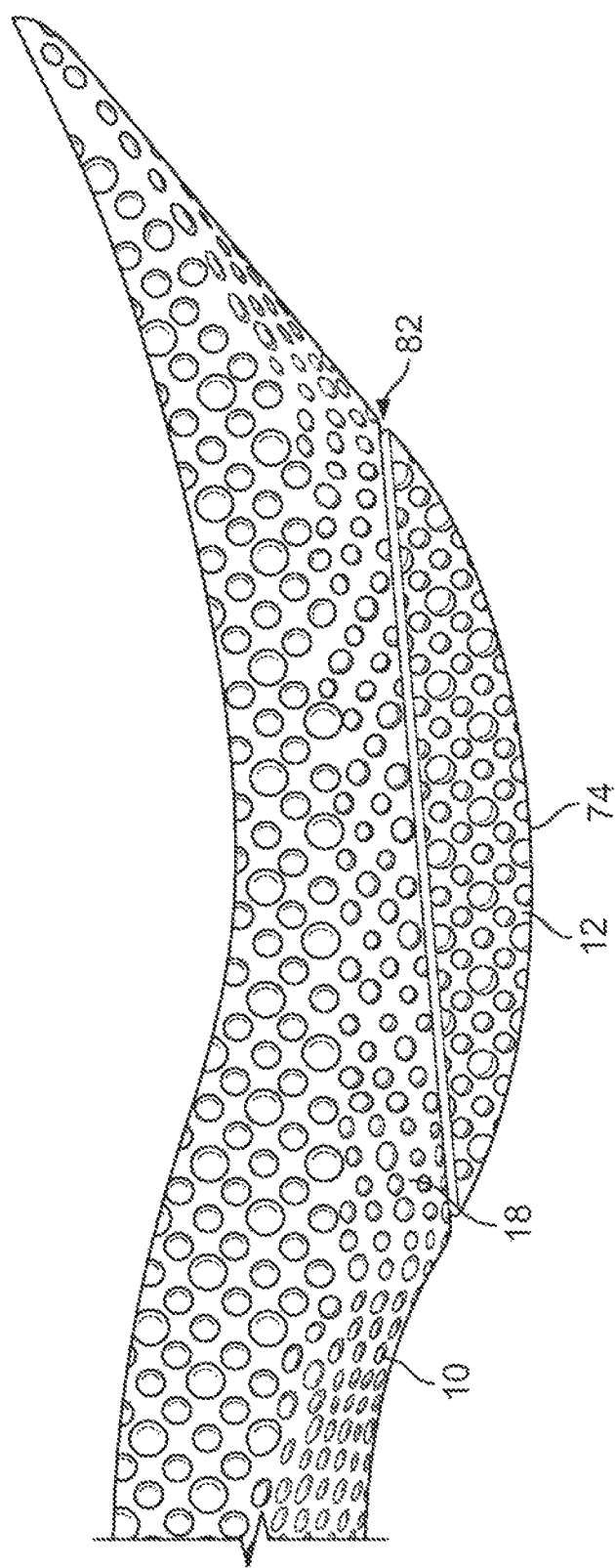
FIG. 9 is a right-side elevation view of the pedal cover and portions of the shoe cover of FIG. 1.
Figure 10:
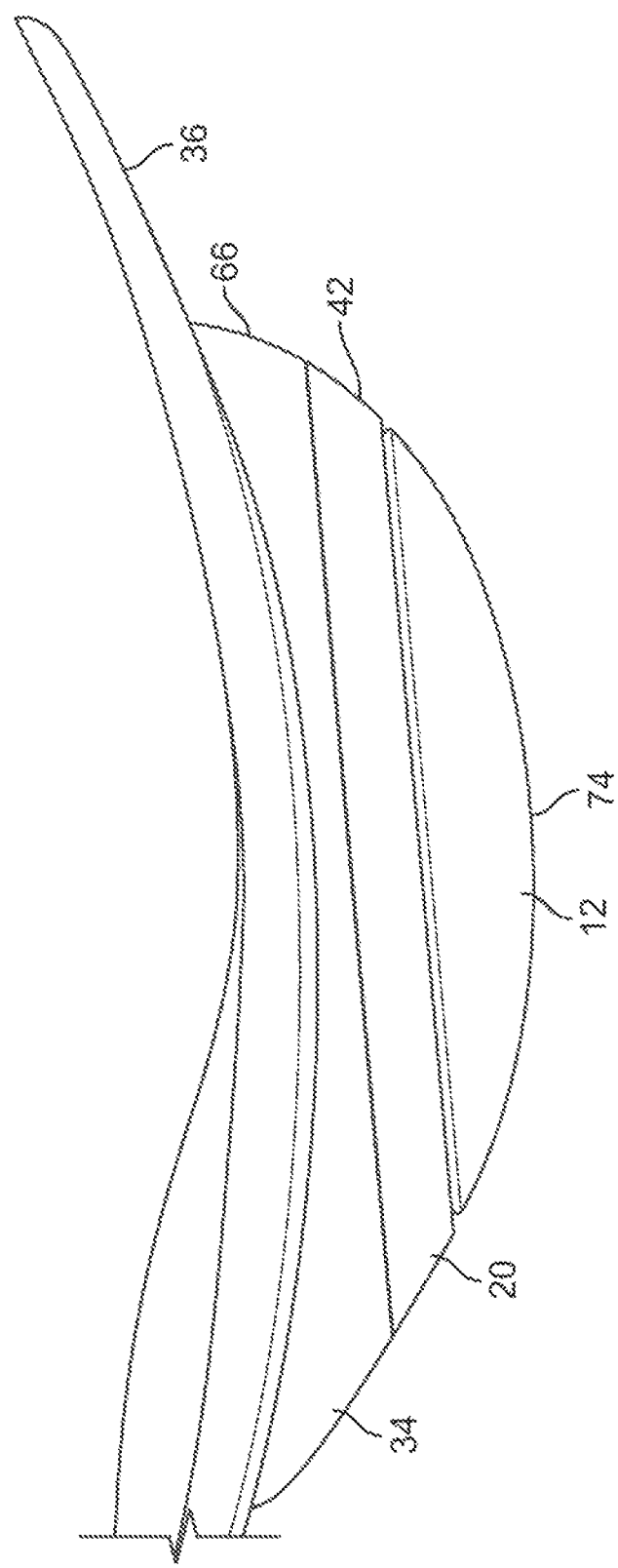
FIG. 10 is a right-side elevation view of the pedal cover of FIG. 1, the cleat cover portion of the shoe cover of FIG. 1, and the base plate cover of FIG. 5 positioned on the underside of a shoe sole, with the remaking portions of the shoe cover removed to show the shoe sole and the details of the cleat cover portion and base plate cover.
Figure 11:
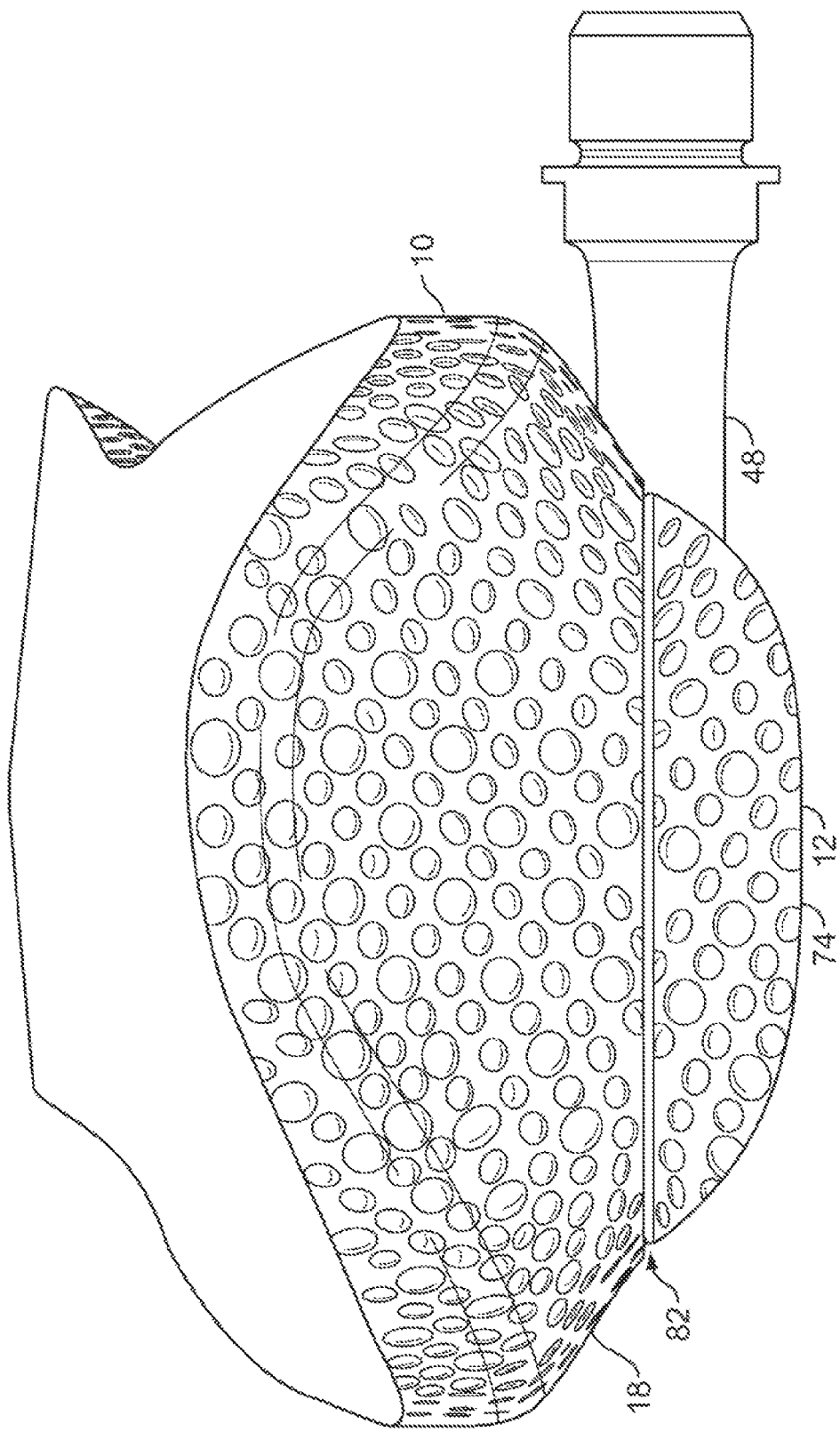
FIG. 11 is a front elevation view of the pedal cover and portions of the shoe cover of FIG. 1, with a pedal spindle protruding from the pedal cover.
Figure 12:
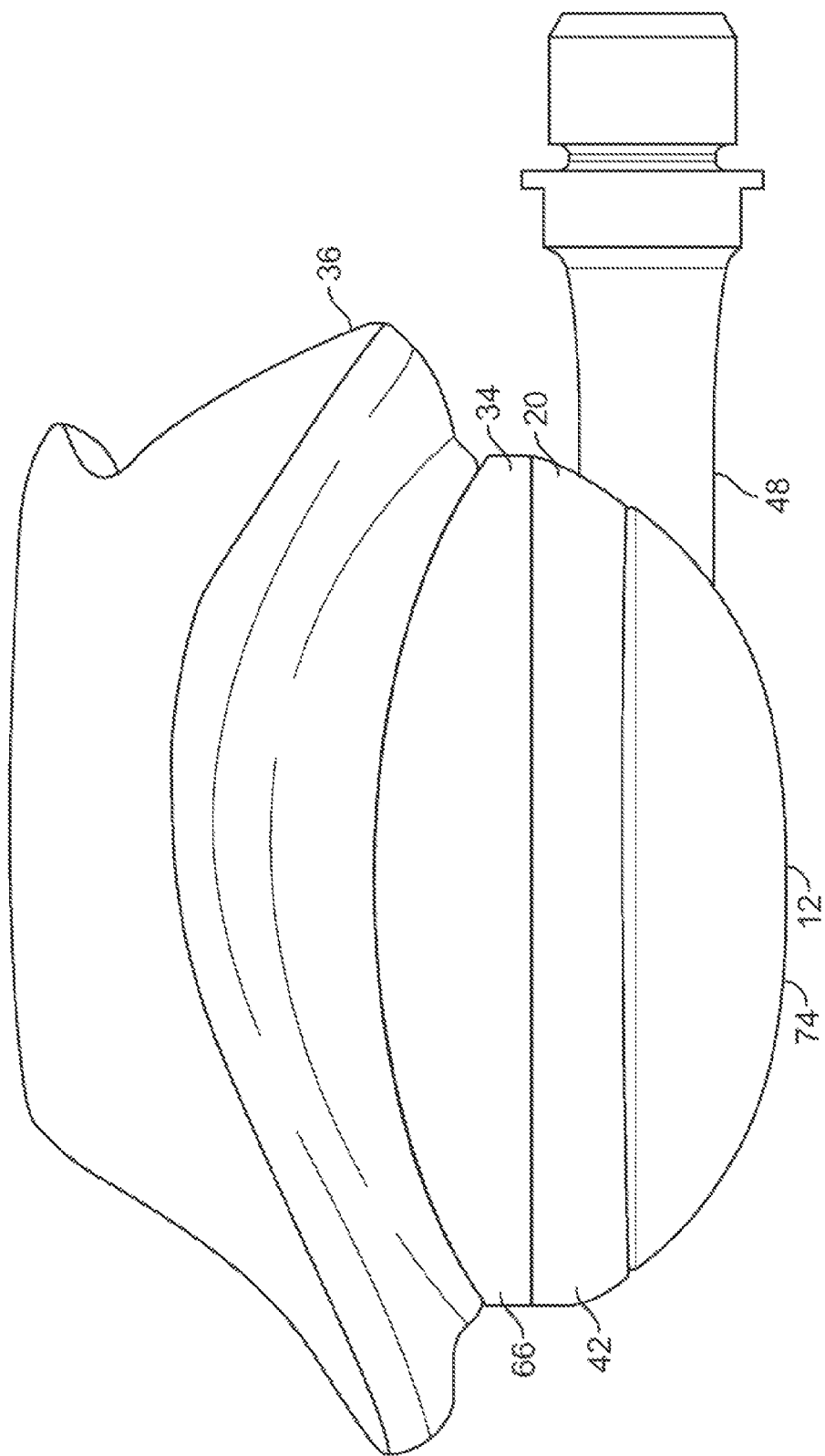
FIG. 12 is a front elevation view of the pedal cover of FIG. 1, the cleat cover portion of the shoe cove of FIG. 1, and the base plate cover of FIG. 5 positioned or the underside of a shoe sole, with the remaining portions of the shoe cover removed to show the shoe sole and the details of the cleat cover portion and base plate cover.
Figure 13:
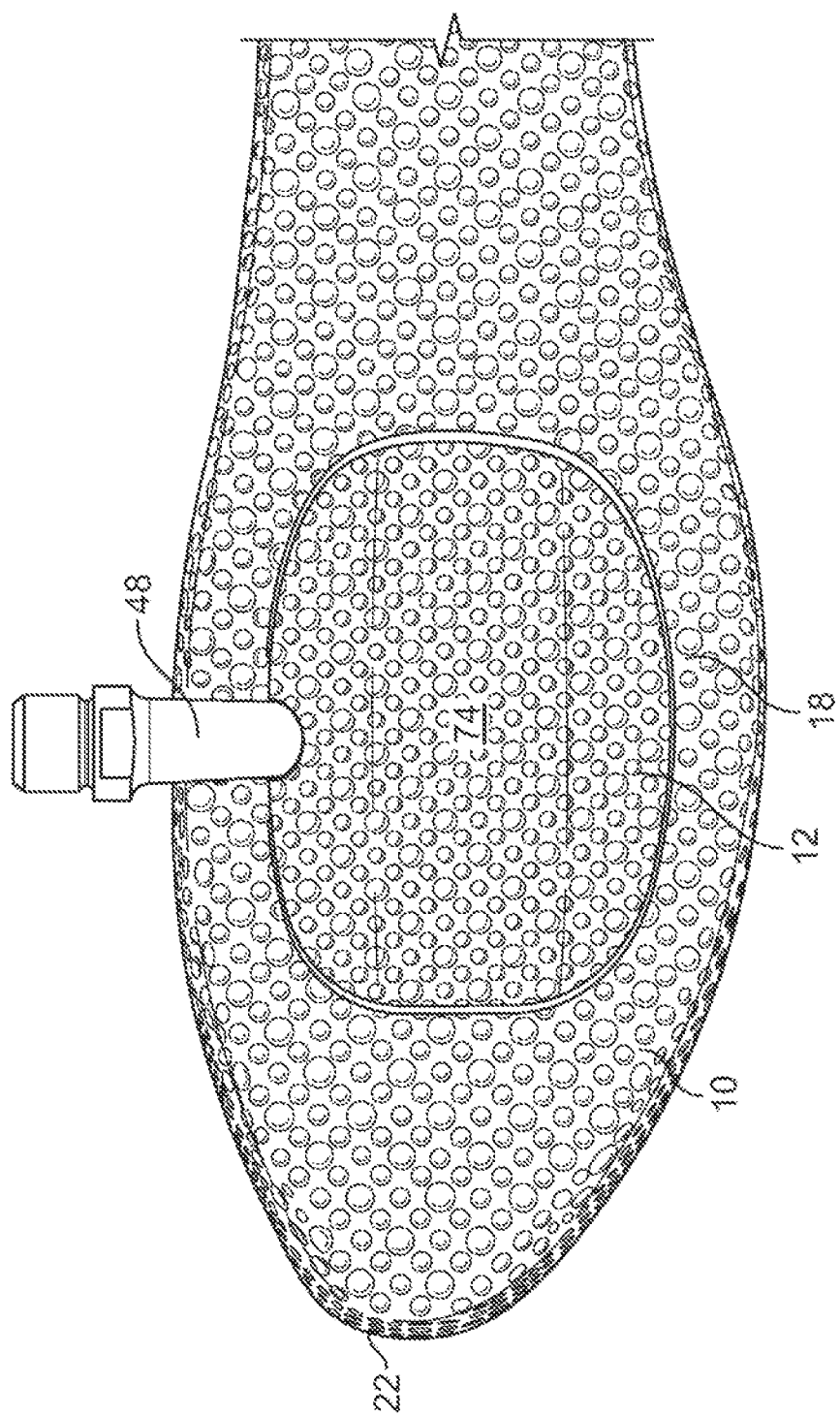
FIG. 13 is a bottom plan view of the pedal cover and portions of the shoe cover of FIG. 1, with a pedal spindle protruding from the pedal cover.
Figure 14:
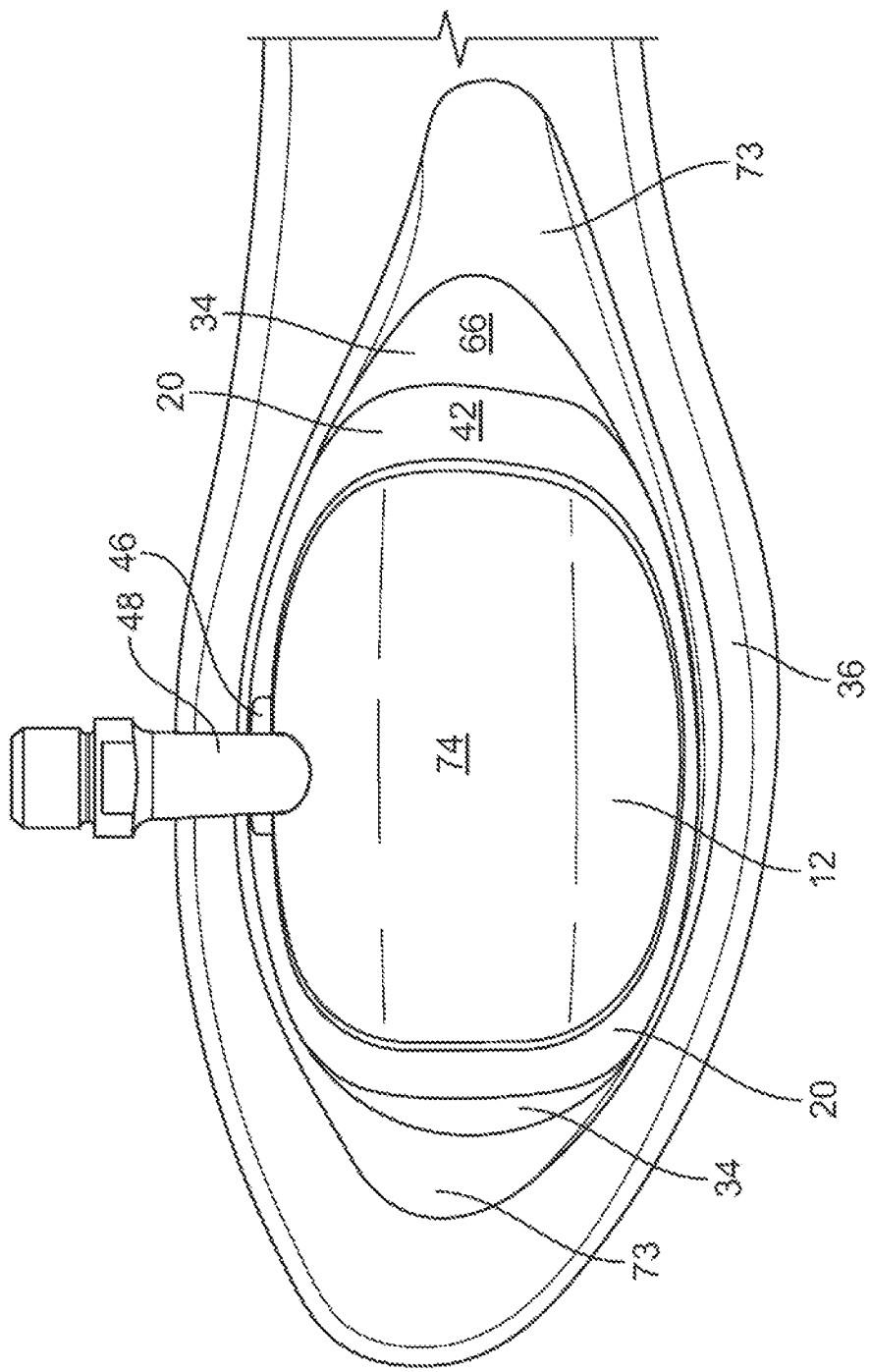
FIG. 14 is a bottom plan view of the pedal cover of FIG. 1, the cleat cover portion of the shoe cover of FIG. 1, and the base plate cover of FIG. 5 positioned on the underside of a shoe sole, with the remaining portions of the shoe cover removed to show the shoe sole and the details of the cleat cover portion and base plate cover.

With reference now to FIG. 4, there is shown the cleat 30, the cleat cover portion 20 of the shoe cover 10, and a base plate cover 34 positioned on the underside of a shoe sole 36 in accordance with an embodiment of the present invention, with the remaining portions of the shoe cover removed to show the shoe sole and the details of the cleat, cleat cover portion, and base plate cover. As shown, the cleat cover portion is configured to surround the cleat. It has a substantially planar bottom surface 38, a substantially planar top surface spaced in a parallel relationship with the bottom surface, and a rounded edge 42. The bottom surface of the cleat cover portion covers a smaller area than the top surface. The top surface of the cleat cover portion is sized and shaped to conform substantially to the size and shape of the bottom surface 44 of the base plate cover (see FIG. 5). The opening formed in the cleat cover portion extends from the bottom surface of the cleat cover portion to the top surface and is configured to receive the cleat. An indentation 46 is defined in the rounded edge 42, proximate to the center of the left side of the cleat cover portion and is configured to accommodate the fop of the spindle 48 of a bicycle pedal 50 (see FIG. 8).

In one embodiment, as shown in FIG. 3, the aerodynamic material that comprises the sole portion 18 of the shoe cover 10 covers the entirety of the rounded edge 42 of the cleat cover portion 20 and is bonded thereto. The aerodynamic material thus is shaped by the rounded edge.

A variety of cleats compatible with a clipless pedal system may be used with the present invention. The particular cleat 30 shown in FIGS. 3 and 4 includes a plastic spring housing 52 and a steel bottom plate 54 configured to be secured, together, by four screws 56 to a plastic base plate 58. The spring housing and bottom plate, together, define a circular central opening 60 sized and shaped to conformably receive the pedal 50. A single horseshoe-shaped spring clip 62 is mounted between the spring housing and the bottom plate, for releasably engaging the pedal when the cleat is positioned over the pedal. Further details about this particular cleat are disclosed in U.S. Patent Application Publication No. 2008/0110294 to Richard M. Bryne, which is incorporated herein by reference. Although the particular cleat shown has a central opening sized and shaped to receive a pedal, the present invention is compatible with a clipless pedal system wherein the cleat has a protection sized and shaped to be conformably received within a corresponding opening in a pedal.

With reference now to FIG. 5, there is shown the base plate cover 34 and base plate 58 positioned on the underside of the shoe sole 36 in accordance with an embodiment of the present invention. The base plate cover is configured to surround the base plate, to which the cleat 30 is configured to be attached. The base plate cover has a substantially planar bottom surface 44, a top surface that substantially conforms to the shape of the underside of the shoe sole, and a rounded edge 66. The bottom surface of the base plate cover covers a smaller area than the top surface. An opening is defined in the base plate cover, extending from the bottom surface to the top surface and configured to receive the base plate.

The base plate 58 itself is configured to be secured to the shoe sole 36 by screws 70 extending through three elongated openings 73 in the base plate. The base plate may be secured to a raised portion 73 of the shoe sole. Further details about this particular base plate are disclosed in U.S. Patent Application Publication No. 2008/0110294 to Richard M. Bryne. The present invention is also compatible with a clipless pedal system wherein the cleat is positioned on the underside of the shoe sole without a base plate.

Figure 6B:
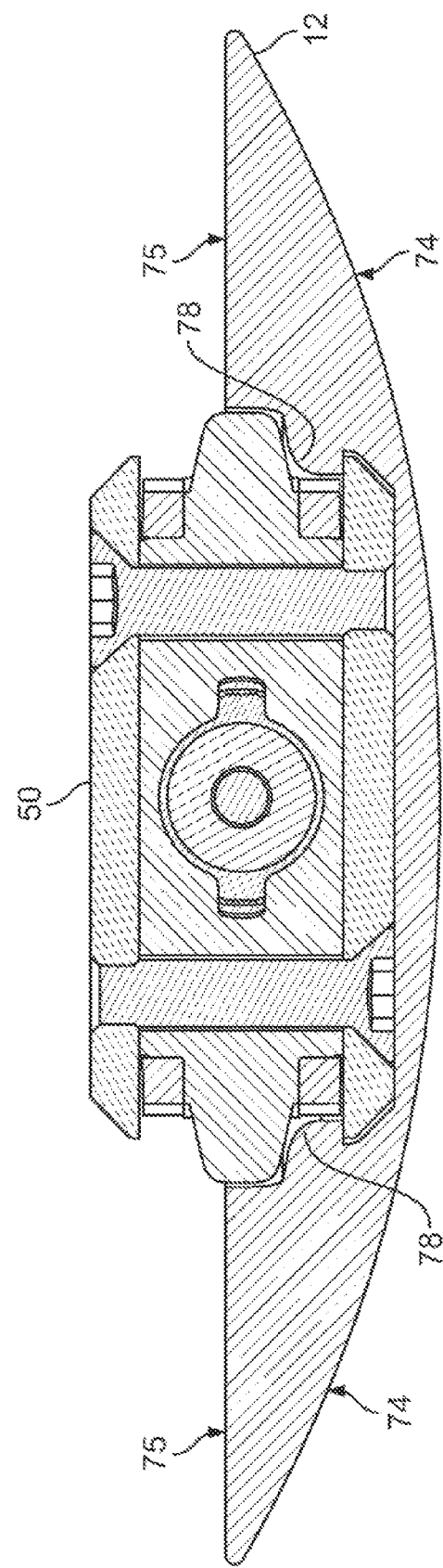
FIG. 6B is a cross-sectional view of the pedal cover of FIG. 1 and the pedal of FIG. 6A, with the pedal cover attached to the pedal.
Figure 7:
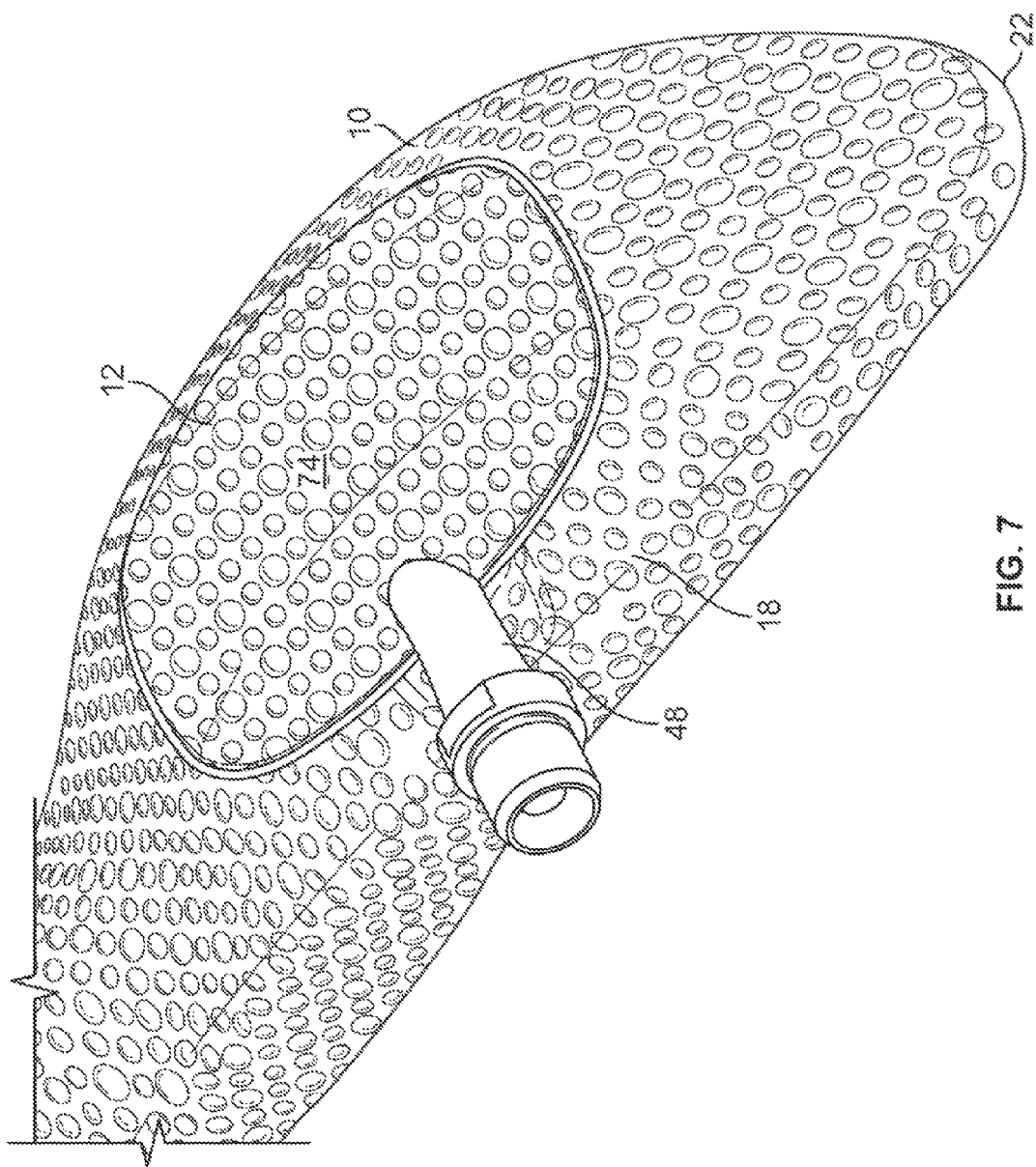
FIG. 7 is a perspective view of the pedal cover and portions of the shoe cover of FIG. 1, with a pedal spindle protruding from the pedal cover.

With reference now to FIGS. 6A and 6B, there is shown the pedal cover 12 and the pedal 50 in accordance with an embodiment of the present invention. The pedal cover is configured to be removably attached to the bottom of the pedal 50. It has a rounded bottom surface 74 and a substantially planar top surface 75 having a recess 76 therein. The top surface of the pedal cover is sized and shaped to conform substantially to the size and shape of the bottom surface 38 of the cleat cover portion 20 of the shoe cover 10. The recess is configured to receive the pedal and extends to the left side of the pedal cover, creating an indentation 77 in the left side that is configured to receive the bottom of the spindle 48 of the pedal. The pedal cover is attached to the pedal by means of a pair of identical, opposing side tabs 78 configured to engage a pair of identical, opposing indentations 79 in the pedal. Four longitudinally extending projections 80 engage four longitudinally extending grooves 81 in the pedal to keep the pedal cover correctly positioned with respect to the pedal.

With reference now to FIGS. 7-14, there are shown various views of the pedal cover 12 and portions of the shoe cover 10 in accordance with an embodiment of the present invention, with the pedal cover in place beneath the shoe cover. In FIGS. 8, 10, 12 and 14, portions of the shoe cover are removed to show the shoe sole 36 and the details of the base plate cover 34 and cleat cover portion 20 of the shoe cover. The combination of the pedal cover 12, cleat cover portion 20, and base plate cover 34 has a general teardrop shape to minimize drag.

A small gap 82 is defined between the pedal cover 12 and the cleat cover portion 20 of the shoe cover 10 when the pedal 50 has been received in the pedal cover, the cleat 30 has been received in the cleat cover portion, and the cleat has engaged the pedal. The gap assists a bicyclist in pivoting the cleat with respect to the pedal so that the cleat can be engaged to and disengaged from the pedal. The gap reduces rubbing between the pedal cover and cleat cover portion as the bicyclist pivots the cleat, thus minimizing the possibility that the shoe cover and pedal cover might interfere with the process of engaging the cleat to and disengaging the cleat from the pedal. In one embodiment, there is less than or equal to approximately 2 Newton meters of rotational torque resistance between the pedal cover and the cleat cover portion as the cleat is pivoted with respect to the pedal.

Figure 15:
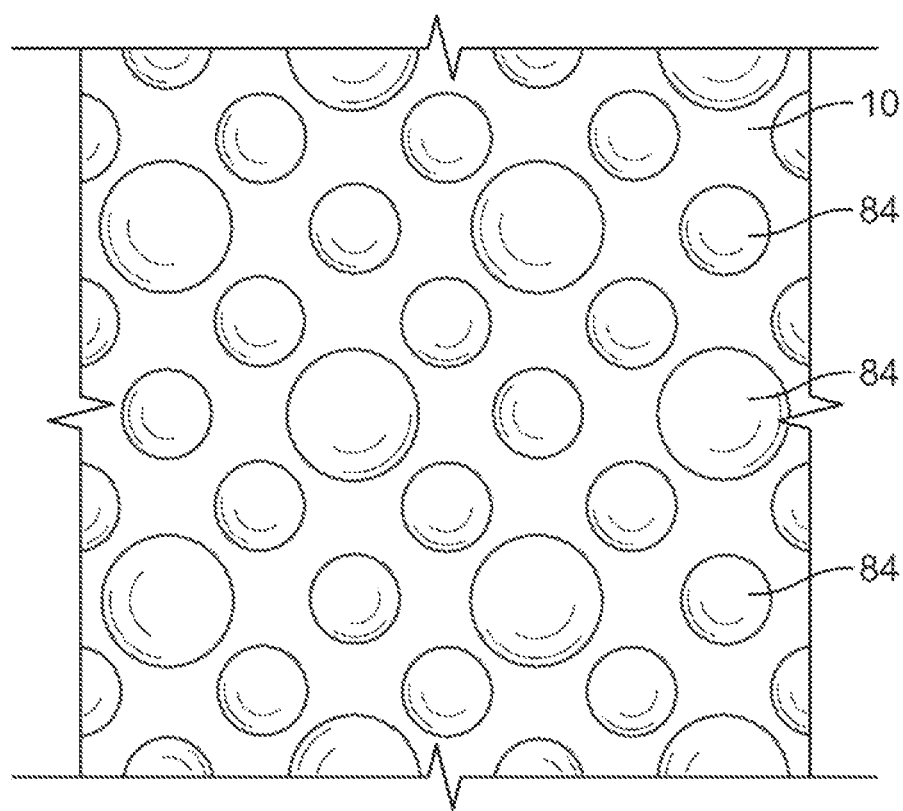
FIG. 15 is a detail view of a portion of the shoe cover of FIG. 1, showing dimples formed in the shoe cover.

With reference now to FIG. 15, there is shown a detail view of a portion of the shoe cover 10, showing dimples 84 formed in the cover. The dimples reduce drag, similar to the way dimples on a golf ball reduce drag.

Although the invention has been described in detail with reference only to the presently preferred embodiments, those skilled in the art will appreciate that various modifications can be made without departing from the invention. Accordingly, the invention is defined only by the following claims.

What is claimed is:

1. An aerodynamic cover for a bicycle pedal, cleat, and shoe, the cleat attached to a base plate and the base plate attached to a bottom surface of the shoe, the aerodynamic cover comprising:
   a pedal cover having
      a rounded bottom surface,
      a substantially planar top surface, and
      a recess defined in the top surface of the pedal cover and configured to receive a bottom portion of the bicycle pedal;
   a main body including an ankle portion having a rear side, a heel portion connected to the ankle portion, and a sole portion connected to the heel portion and having an underside;
   an opening formed in the sole portion for allowing a bicycle pedal to be engaged to the bicycle cleat;
   an outwardly extending fin that stretches rearwardly outward from a rearmost portion of the rear side of the ankle portion, around the heel portion, to the underside of the sole portion;
   a cleat cover having a substantially planar bottom surface,
a substantially planar top surface spaced in a substantially parallel relationship with the bottom surface of the cleat cover, and
an opening extending from the bottom surface of the cleat cover to the top surface of the cleat cover and configured to receive the cleat; and
a base plate cover having
a substantially planar bottom surface,
a top surface that substantially conforms to the bottom surface of the shoe, and
an opening extending from the bottom surface of the base plate cover to the top surface of the base plate cover and configured to receive the base plate.

2. The aerodynamic cover of claim 1, wherein the cleat cover is attached to the sole portion.

3. The aerodynamic cover of claim 1, wherein the bottom surface of the cleat cover covers a smaller area than the top surface of the cleat cover.

4. The aerodynamic cover of claim 1, wherein the bottom surface of the base plate cover covers a smaller area than the top surface of the base plate cover.

5. The aerodynamic cover of claim 1, wherein:
a gap is defined between the pedal cover and the cleat cover when the bottom portion of the bicycle pedal has been received in the recess defined in the top surface of the pedal cover, the cleat has been received in the opening extending from the bottom surface of the cleat cover to the top surface of the cleat cover, and the cleat has engaged the bicycle pedal; and
the gap inhibits excessive friction between the pedal cover and the cleat cover as the cleat is pivoted with respect to the pedal, so that there is less than or equal to approximately 2 Newton meters of rotational torque resistance between the pedal cover and the cleat cover as the cleat is pivoted with respect to the pedal.

6. An aerodynamic cover for a bicycle pedal, cleat, and shoe, the cleat attached to a base plate and the base plate attached to a bottom surface of the shoe, the aerodynamic cover comprising:
a pedal cover having
a rounded bottom surface,
a substantially planar top surface, and
a recess defined in the top surface of the pedal cover and configured to receive a bottom portion of the bicycle pedal;
a main body including an ankle portion having a rear side, a heel portion connected to the ankle portion, and a sole portion connected to the heel portion and having an underside;
an opening formed in the sole portion for allowing a bicycle pedal to be engaged to the bicycle cleat;
an outwardly extending fin that stretches from the rear side of the ankle portion, around the heel portion, to the underside of the sole portion;
a cleat cover having
a substantially planar bottom surface,
a substantially planar top surface spaced in a substantially parallel relationship with the bottom surface of the cleat cover, and
an opening extending from the bottom surface of the cleat cover to the top surface of the cleat cover and configured to receive the cleat; and
a base plate cover having
a substantially planar bottom surface,
a top surface that substantially conforms to the bottom surface of the shoe, and
an opening extending from the bottom surface of the base plate cover to the top surface of the base plate cover and configured to receive the base plate.

7. The aerodynamic cover of claim 6, wherein the cleat cover is attached to the sole portion.

8. The aerodynamic cover of claim 6, wherein the bottom surface of the cleat cover covers a smaller area than the top surface of the cleat cover.

9. The aerodynamic cover of claim 6, wherein the bottom surface of the base plate cover covers a smaller area than the top surface of the base plate cover.

10. The aerodynamic cover of claim 6, wherein:
a gap is defined between the pedal cover and the cleat cover when the bottom portion of the bicycle pedal has been received in the recess defined in the top surface of the pedal cover, the cleat has been received in the opening extending from the bottom surface of the cleat cover to the top surface of the cleat cover, and the cleat has engaged the bicycle pedal; and
the gap inhibits excessive friction between the pedal cover and the cleat cover as the cleat is pivoted with respect to the pedal, so that there is less than or equal to approximately 2 Newton meters of rotational torque resistance between the pedal cover and the cleat cover as the cleat is pivoted with respect to the pedal.

* * * * *